(12) United States Patent
Copping et al.

(10) Patent No.: US 6,461,677 B1
(45) Date of Patent: Oct. 8, 2002

(54) METHOD OF FABRICATING AN ELECTRICAL COMPONENT (75) Inventors: William J. Copping, Youngstown, NY (US); Bretton I. Rickett, Wheaton, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/551,368

(22) Filed: Apr. 18, 2000

(51) Int. Cl.⁷ .............................. B01D 1/32; C25D 5/02; C25D 5/08; B05D 3/06
(52) U.S. Cl. ...................... 427/282; 205/118; 205/133; 427/558
(58) Field of Search .................. 427/282; 205/118, 205/133

(56) References Cited

U.S. PATENT DOCUMENTS

| | | | |
|---|---|---|---|
| 4,174,261 A | 11/1979 | Pellegrino | 204/273 |
| 4,242,369 A | 12/1980 | Mansukhani | 427/47 |
| 4,686,015 A * | 8/1987 | Samuels et al. | 204/15 |
| 4,717,639 A | 1/1988 | Dubin et al. | 430/124 |
| 4,767,489 A | 8/1988 | Lindner | 156/345 |
| 4,853,317 A * | 8/1989 | Hayes | 430/318 |
| 5,275,689 A | 1/1994 | Felten et al. | 156/628 |
| 5,382,315 A | 1/1995 | Kumar | 156/643 |
| 5,393,580 A | 2/1995 | Ma et al. | 428/29 |
| 5,494,781 A | 2/1996 | Ohitani et al. | 430/313 |
| 5,626,483 A | 5/1997 | Naitoh | 439/74 |
| 5,637,426 A | 6/1997 | Uchikawa | 430/9 |
| 5,721,007 A * | 2/1998 | Lynch et al. | 427/98 |
| 5,839,188 A | 11/1998 | Pommer | 29/830 |

* cited by examiner

Primary Examiner—Edna Wong
(74) Attorney, Agent, or Firm—Robert J. Zeitler (57) ABSTRACT

A method of fabricating an electrical component includes the steps of providing a metal electrical component and immersing the component in a bath of resist material. A selected area of the component is prepared by an ink-jet process for reception of a conductive plating material. The plating material is applied to the selected area, and the resist material is removed from the component.

17 Claims, 9 Drawing Sheets

METHOD OF FABRICATING AN ELECTRICAL COMPONENT

FIELD OF THE INVENTION

This invention generally relates to the art of electrical connectors and, particularly, to a method of fabricating an electrical component, such as a metal terminal.

BACKGROUND OF THE INVENTION

A typical electrical connector includes some form of dielectric housing for mating with a complementary connecting device, such as a mating connector. The housing may be adapted for mounting on a printed circuit board, with a receptacle for mating with the complementary connector, or the housing may receive a second printed circuit board in a board-to-board connection. Whatever the connector configuration, the dielectric housing typically mounts a plurality of conductive terminals or contacts.

An electrical terminal normally includes a terminating portion or end and a contact portion or end. The terminating end is terminated to an electrical wire, a circuit trace on a printed circuit board, a conductor strip on a flat flexible cable or any other conductor of an appropriate electrical device. The contact end of the terminal is adapted for engaging a contact or a contact portion of a terminal of the electrical device to which the connector is mated or interfaced, such as the complementary mating connector. It is highly desirable to plate the contact portion or end of the terminal with a very highly conductive material, such as a precious metal like gold. For obvious cost considerations, the entire terminal preferably is not plated but only the contact portion. In addition, the body or thickness of the terminal is not fabricated of such highly conductive materials as gold, because such materials do not provide the resiliency necessary for most terminals. It should be understood, however, that the invention herein is not limited to electrical terminals and is equally applicable and advantageous for fabricating a variety of electrical components.

With that understanding, some electrical terminals or components are easily plated with the highly conductive material when the contact portions of the terminals are at extreme or distal ends of the terminal configurations. Those ends simply are dipped or immersed in an electrolytic bath to cover the end contact portions, and the precious metal is electroplated on those ends. However, in many applications, the contact portions of the terminals are not at ends or edges thereof, and the dipping process cannot be used. In those applications, a physical masking device is applied to the terminals in areas not to be plated, leaving the contact portions of the terminals exposed. The terminals then are immersed in an electroplating bath, and only the contact portions of the terminals become plated.

Use of such physical masking devices is attended by mechanical wear of the physical masking device and loss of precious plating material due to gaps between the physical masking device and the terminal. Moreover, because each physical masking device is only applicable to a specific range of terminal configurations, a different masking device must be made, maintained and installed into the plating equipment when a plating line is to be converted to plate a terminal from a different range. Lastly, the relatively bulky physical masking devices block the mass transfer of plating material onto the terminal to reduce plating line speed. The present invention is directed to improving the cost effectiveness, precision, speed and versatility of selective plating.

SUMMARY OF THE INVENTION

An object, therefore, of the invention is to provide a new and improved method of fabricating an electrical component.

In the exemplary embodiment of the invention, the method includes the steps of providing a metal electrical component and immersing the electrical component in a bath of resist material. A selected area, such as a contact area, of the component is prepared for reception of a conductive plating material. A highly conductive plating material is applied to the selected area. The resist material then is removed from the electrical component.

As disclosed herein, the selected area is prepared by an ink-jet process. The highly conductive plating material is applied in an electroplating bath. The resist material is removed by a solvent, preferably by immersing the plated electrical component in a bath of the solvent.

According to one embodiment of the invention, the selected area is prepared prior to immersing the component in the bath of resist material, by applying to the selected area a masking material which repels the resist material. The masking material is removed prior to applying the conductive plating material. Preferably, the masking material is removed by immersing the component in a bath of rinsing material.

In another embodiment of the invention, the step of immersing the component in a bath of resist material comprises immersing the component in a bath of ultraviolet (UV) curable resist material. The preparing step comprises applying a masking material over the UV curable resist material in the selected area. The unmasked resist material then is cured by using UV rays. The masking material and the uncured resist material in the selected area then are removed prior to the plating step.

In a further embodiment of the invention, the selected area is prepared by removing the resist material in the selected area by a solvent in an ink-jet process.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
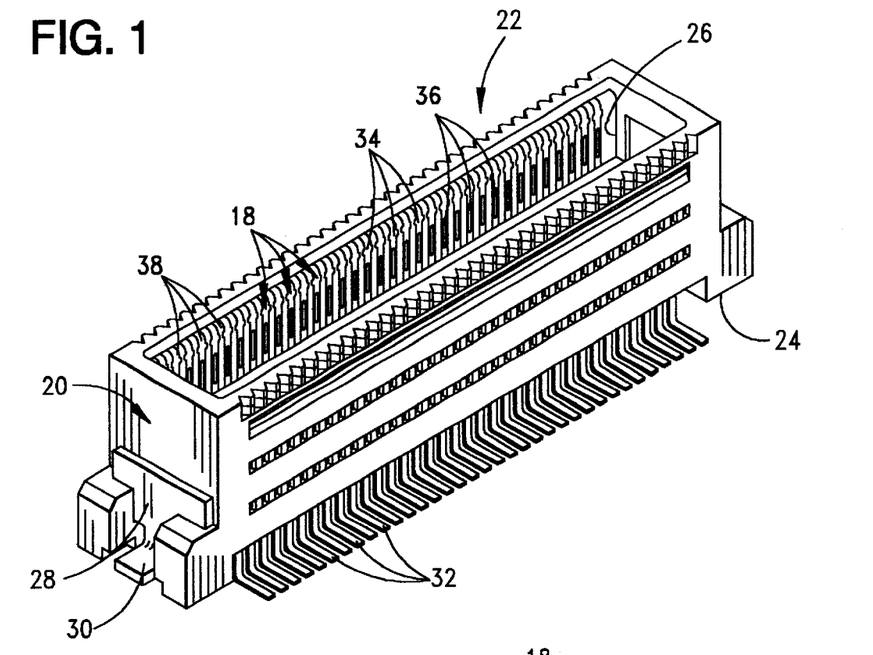
FIG. 1 is a perspective view of an electrical connector including a plurality of terminals which can be fabricated according to the method of the invention.

Referring to the drawings in greater detail, and first to FIG. 1, the invention is disclosed in conjunction with the fabrication of a plurality of conductive terminals, generally designated 18, which are mounted in a dielectric housing, generally designated 20, of an electrical connector, generally designated 22. However, it should be understood that the methods of the invention are applicable for fabricating a wide variety of electrical components, and the following explanation of the invention as applied to terminals 18 of connector 22 is for illustration purposes only.

With that understanding, housing 20 of connector 22 has a mounting surface 24 for mounting on a printed circuit board (not shown). The opposite side (the top side as viewed in FIG. 1) has an elongated slot or receptacle 26 for receiving a plug portion of a complementary mating connector, for instance. Connector 22 could be adapted for receiving a second printed circuit board in slot 26, in a board-to-board interface. A metal "fitting nail" 28 is mounted to each end of housing 20 and includes a foot portion 30 for securing, as by soldering, to a mounting pad on the printed circuit board to which the connector is mounted.

Each terminal 18 includes a foot or solder tail portion 32 extending outwardly and at a right-angle to a contact arm 34. The terminals have right-angular configurations so that solder tails 32 project outwardly from housing 20 generally flush with mounting surface 24 of the housing, and contact arms 34 project upwardly into receptacle 26 along opposite sides thereof. The solder tails are connected, as by soldering, to appropriate circuit traces on the printed circuit board to which the connector is mounted. Contact arms 34 have contact portions 36 exposed at opposite sides of receptacle 26 for engaging appropriate contacts of the complementary mating connector or appropriate circuit traces on a second printed circuit board, whichever is inserted into receptacle 26. Finally, terminals 18 include end portions 38 which are bent outwardly from the distal ends of contact arms 34.

Figure 2:
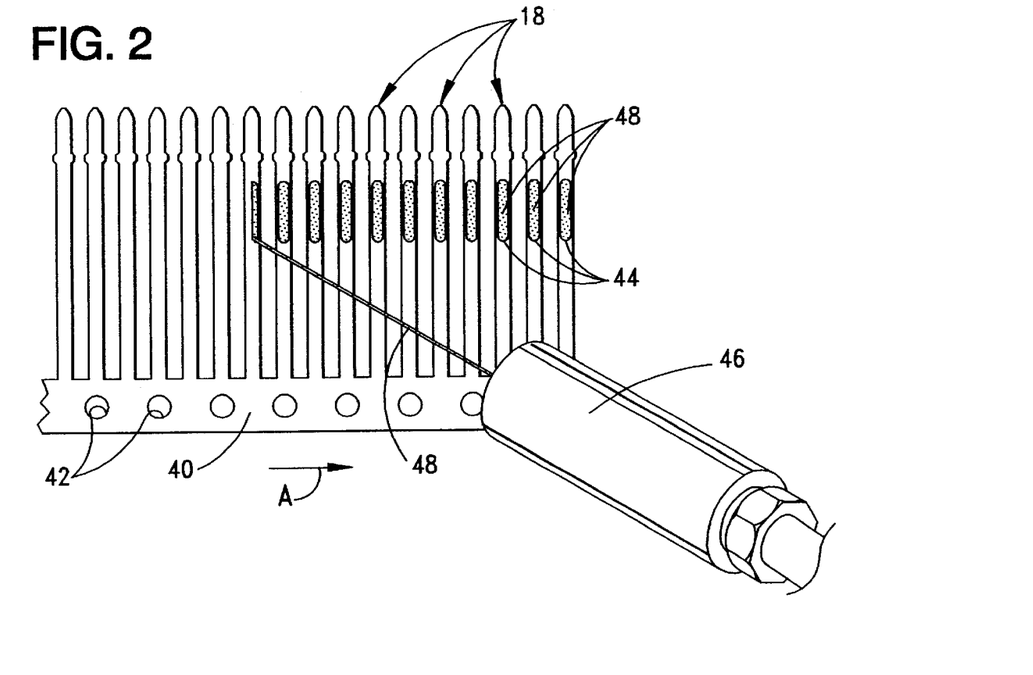
FIGS. 2–7 show various steps in a first embodiment for carrying out the method of the invention.

Terminals 18 are stamped and formed from conductive sheet metal material, and FIG. 2 (as well as other figures herein) shows a plurality of the terminals stamped from the sheet metal material and prior to forming solder tails 32, contact arms 34 and ends 38 as described above in relation to their final configurations shown in FIG. 1. The terminals are shown in FIG. 2 still connected to a carrier strip 40 which has indexing holes 42 for indexing the terminals in the direction of arrow "A" through the various stamping and other steps in the process of fabricating the terminals.

Figure 3:
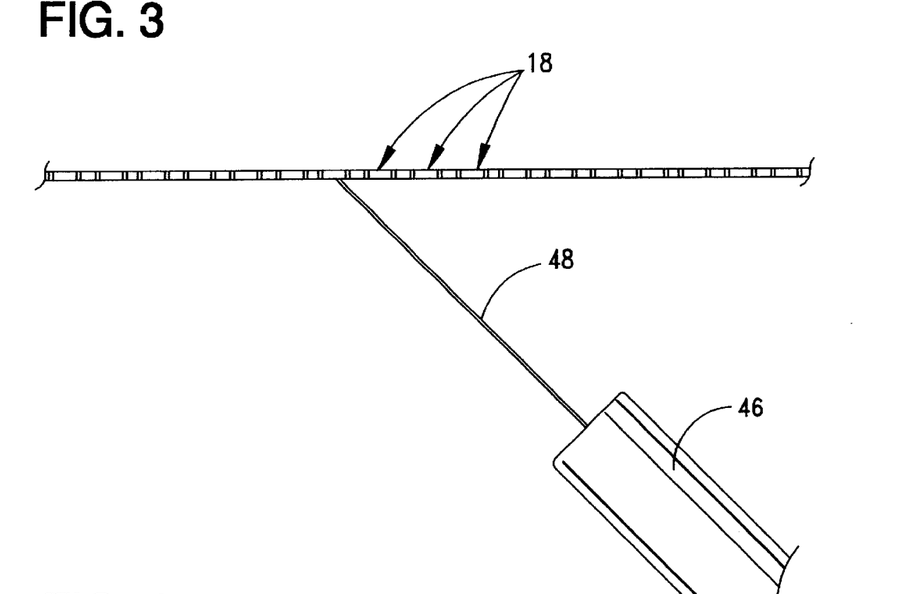

FIGS. 2–7 show the steps in a first embodiment for carrying out the method of the invention, and FIGS. 2 and 3 show a first step in the first embodiment, namely preparing a selected area 44 of each terminal for reception of a conductive plating material. In particular, an ink-jet head 46 is used to direct a stream of masking material 48 to cover selected areas 44 which correspond to contact portions 36 (FIG. 1) of terminals 18. The masking material repels a resist material subsequently applied.

Figure 4:
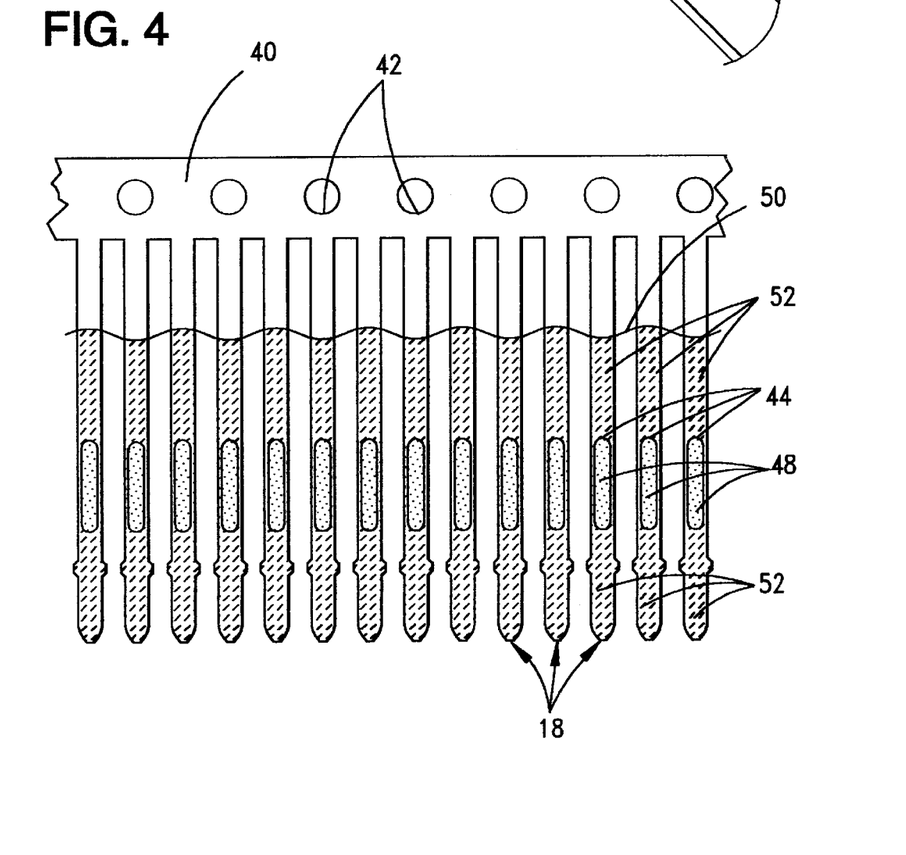
Figure 5:
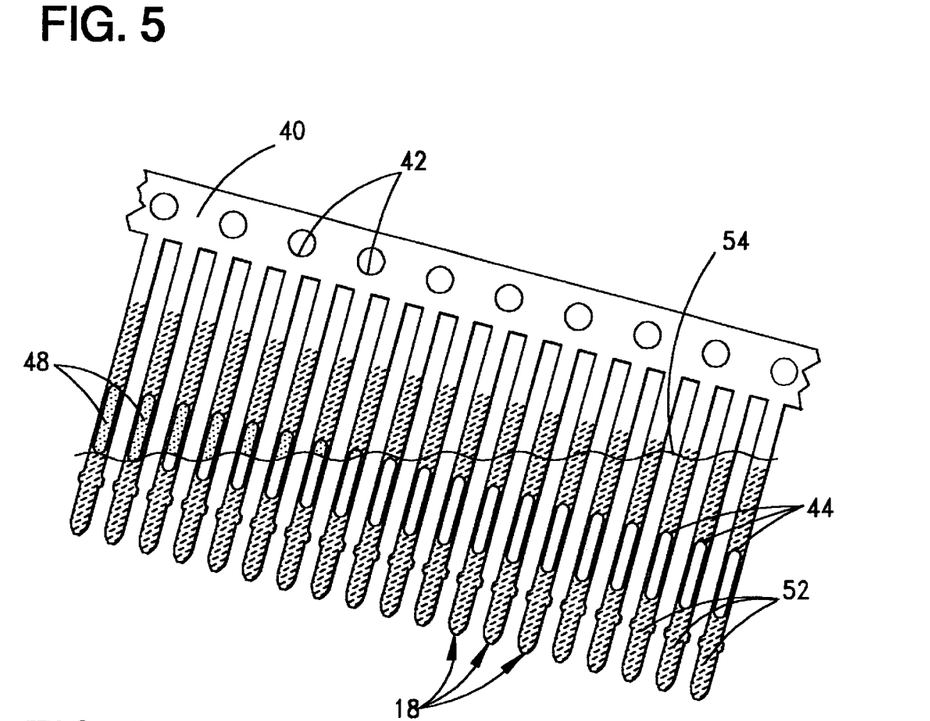

After masking material 48 is applied to selected areas 44 by the ink-jet process of FIGS. 2 and 3, the masked terminals then are immersed in a bath of resist material 50, as seen in FIG. 4. The resist material coats the areas of the terminals immersed in the bath, as at 52, except for selected areas 44 which were covered by the masking material in the ink-jet process. In an embodiment, the resist material has a greater surface energy than the masking material 48. The terminals then are immersed in a rinsing bath 54 as shown in FIG. 5, whereupon masking material 48 is rinsed away, leaving selected areas 44 clean for plating.

Figure 6:
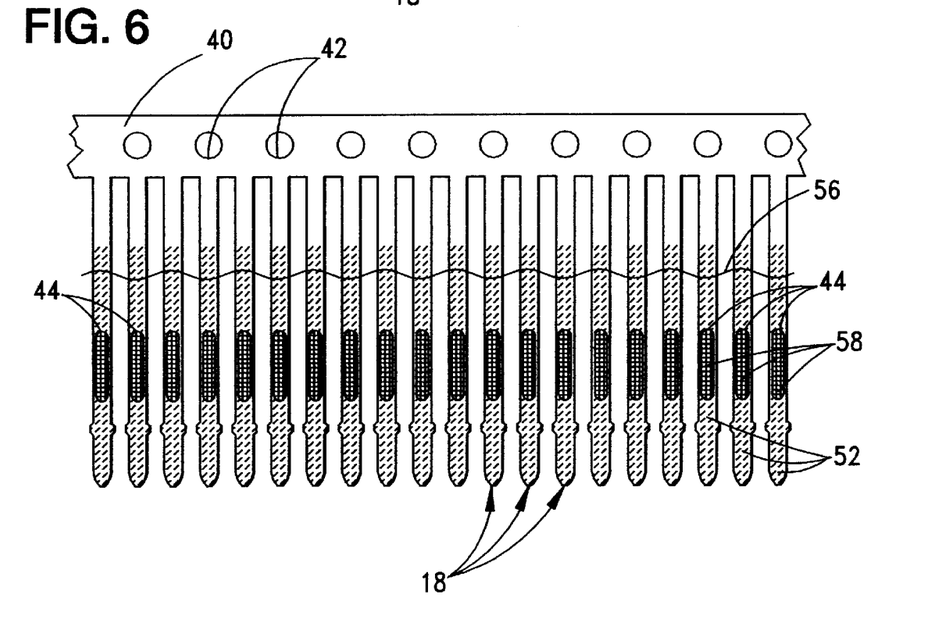
Figure 7:
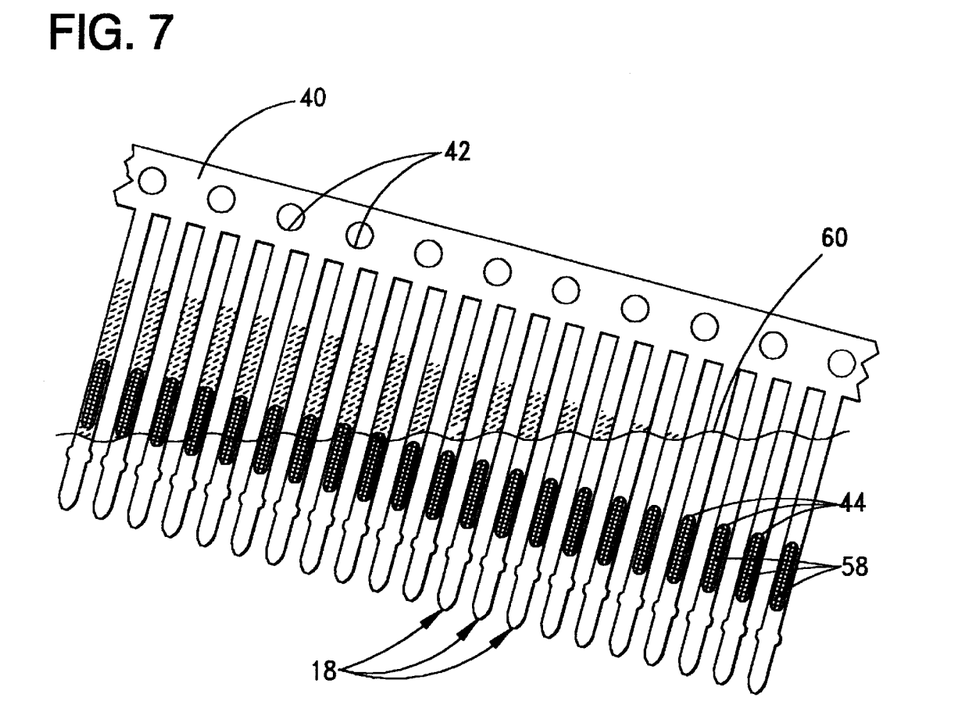

As seen in FIG. 6, the terminals then are immersed in a plating bath 56 whereat selected areas 44 are plated with a conductive plating material 58, such as gold or the like. In an embodiment, the plating bath is an electroplating bath. In an additional embodiment, the plating material is highly conductive, more conductive than the sheet metal material out of which the terminals 18 are stamped. The terminals then are immersed in a solvent bath 60 as shown in FIG. 7, whereupon the resist material is dissolved, leaving selected areas or contact portions 44 plated with the conductive plating material. The terminals, still attached to carrier strip 40 then can be moved to subsequent work stations whereat the terminals are formed into their ultimate configurations, including solder tails 32, contact arms 34 and curved ends 38, and the terminals can be inserted into housing 20 of connector 22 as described above in relation to FIG. 1.

Figure 8:
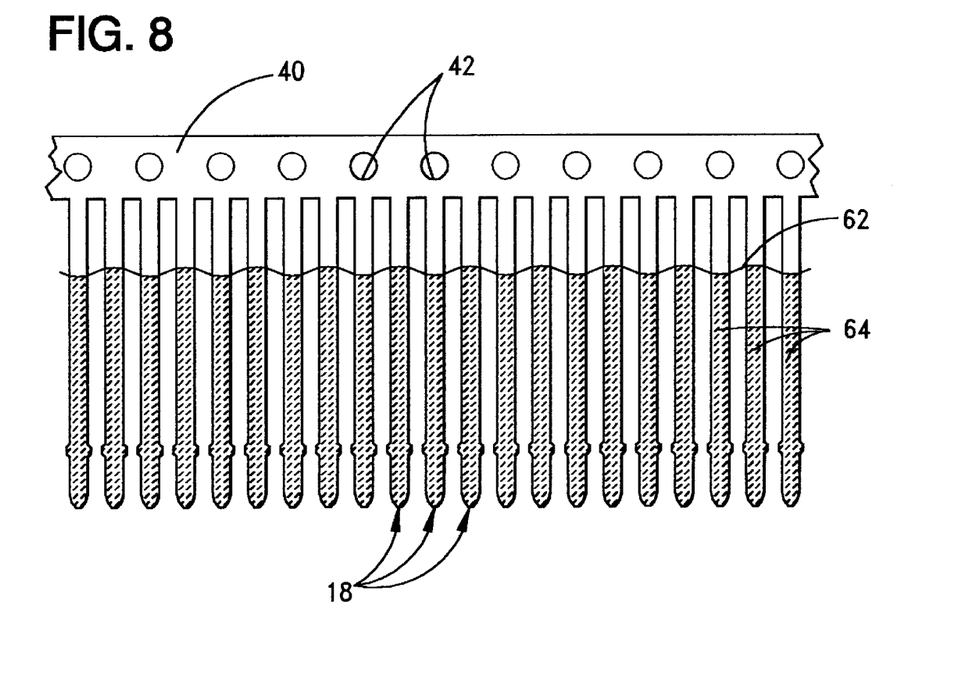
FIGS. 8–13 show various steps in a second embodiment for carrying out the method of the invention.
Figure 9:
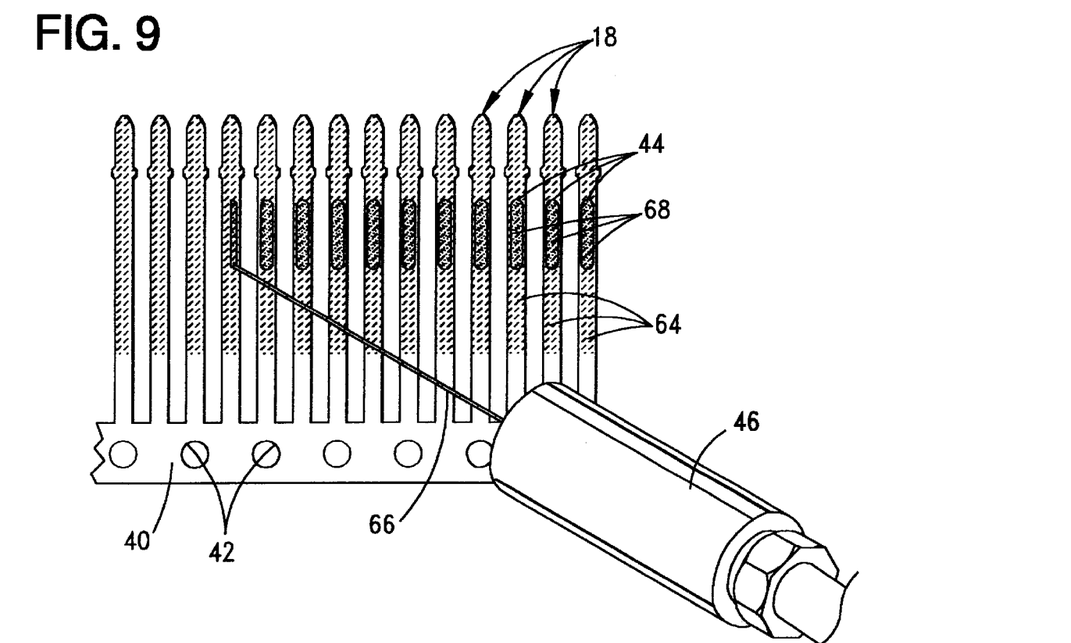

FIGS. 8–13 show the steps in a second embodiment for carrying out the method of the invention. Specifically, FIG. 8 shows the terminals immersed in a bath 62 of resist material 64 for covering substantially the entirety of the terminals, at least the extent of the terminals which eventually will be immersed in a plating bath. Resist material 64 is an ultraviolet (UV) curable resist material. FIG. 9 shows ink-jet head 46 directing a jet stream 66 of a masking material 68 onto selected areas 44. The masking material is a material which blocks the transmission of UV wavelengths to the underlying resist material 64.

Figure 10:
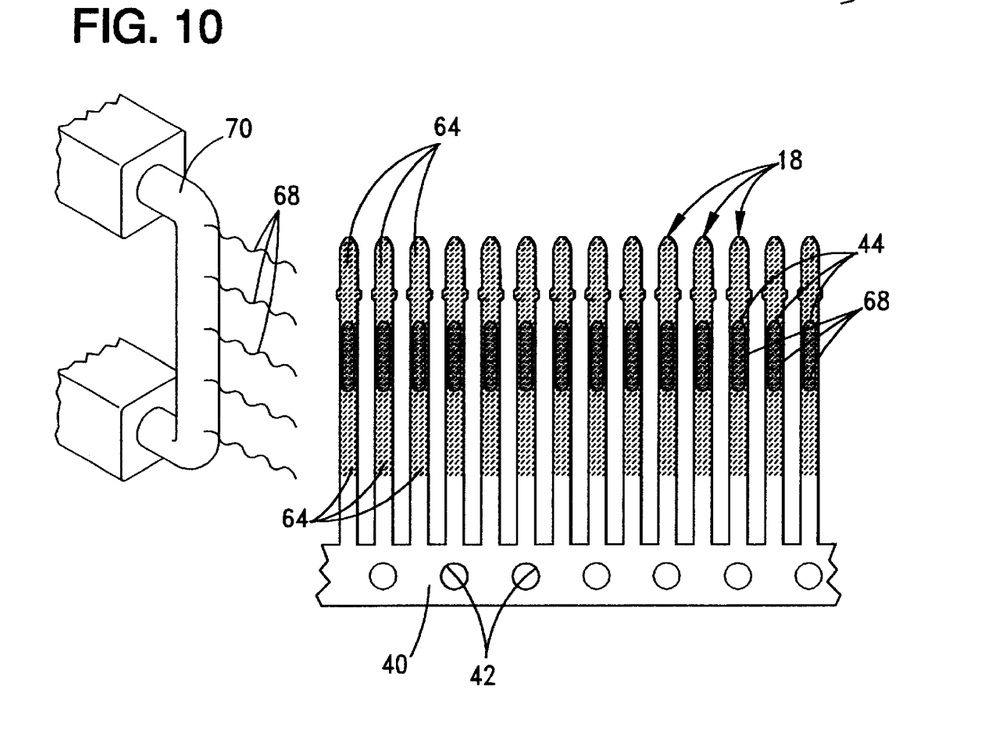
Figure 11:
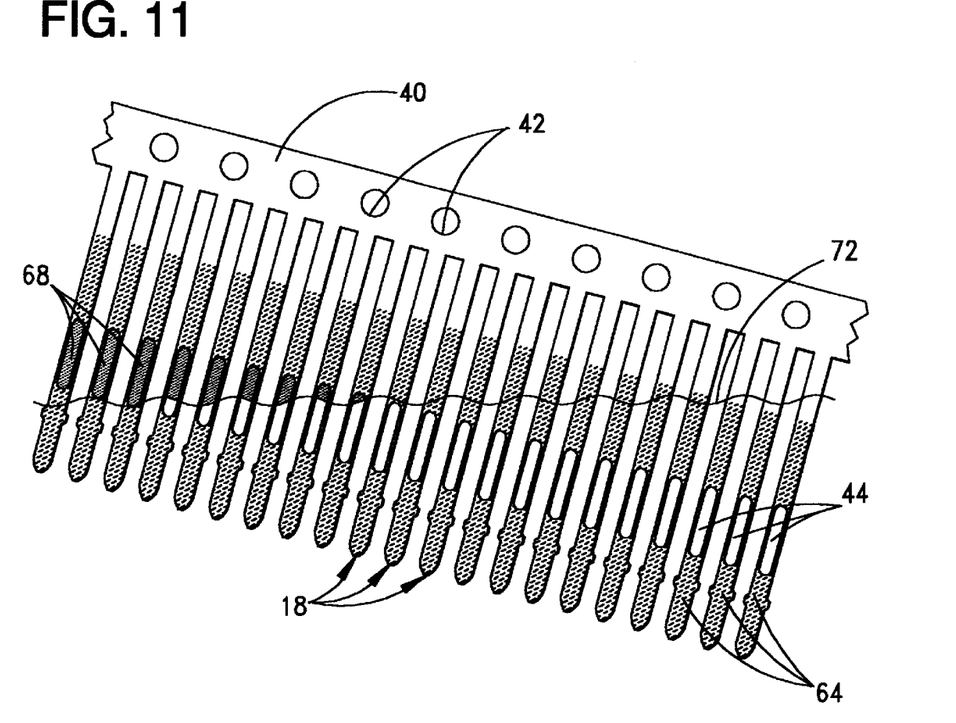

The next step in the second embodiment is shown in FIG. 10, wherein ultraviolet rays 68 from a source 70 thereof are directed onto the terminals to cure the UV curable resist material 64 but not selected areas 44 covered with the UV resistant masking material 68 which was applied by the inkjet process. The terminals then are immersed in a rinsing bath 72 as shown in FIG. 11, whereat masking material 68 and the uncured resist material therebeneath are rinsed away, leaving selected areas 44 clean for plating.

Figure 12:
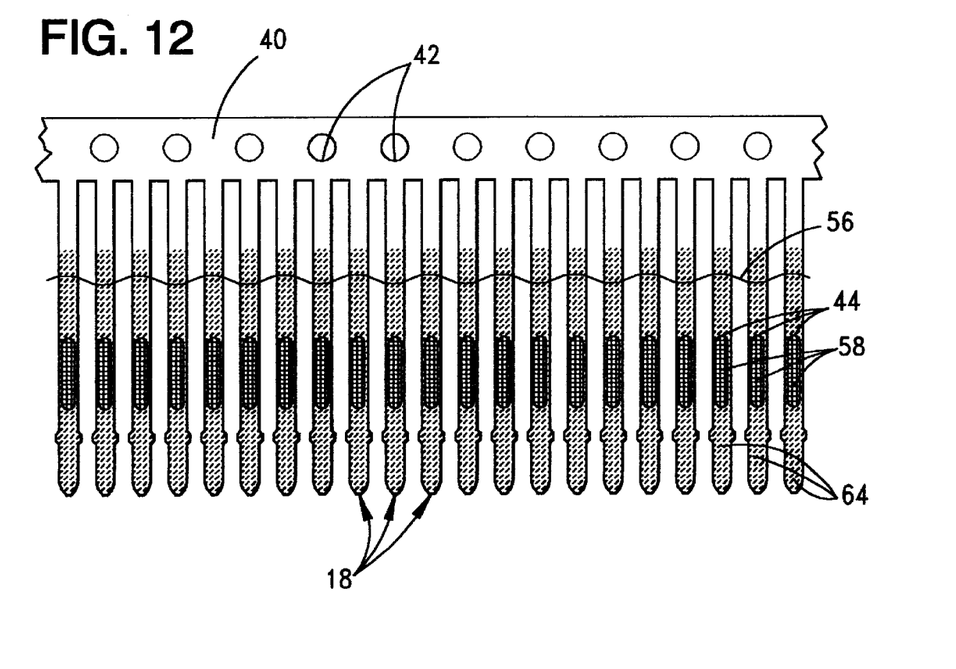
Figure 13:
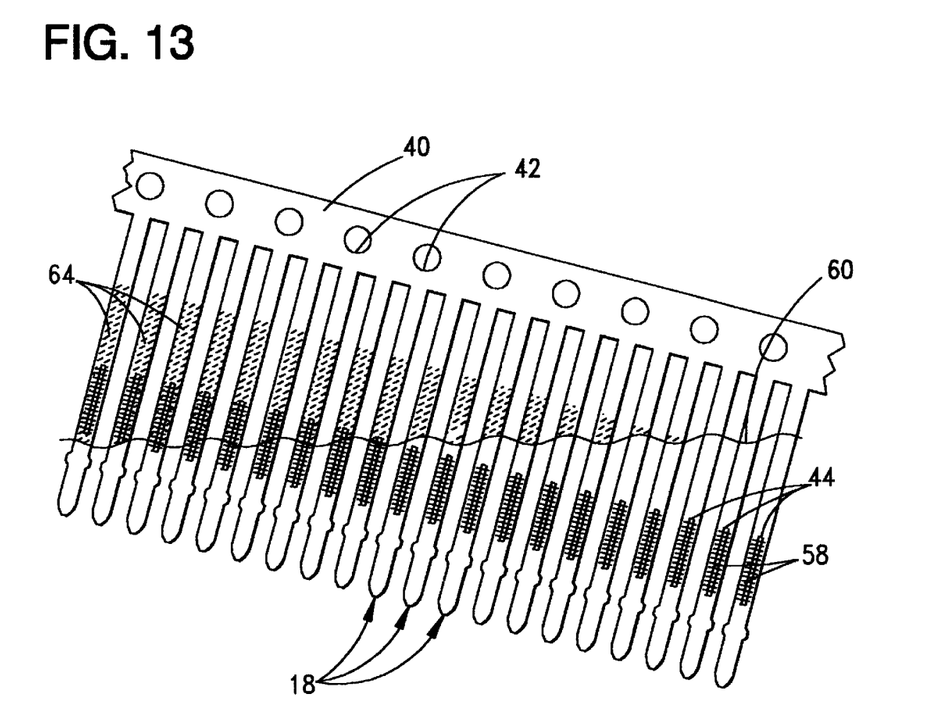

FIG. 12 shows the plating step of the second method of the invention and, like FIG. 6, the terminals are immersed in an electroplating bath 56 whereat selected areas 44 are plated with a highly conductive plating material 58, such as gold. The terminals then are immersed in solvent bath 60 which dissolves resist material 64 and leaves the terminals with only selected areas 44 plated with the conductive plating material 58 as shown in FIG. 13.

Figure 14:
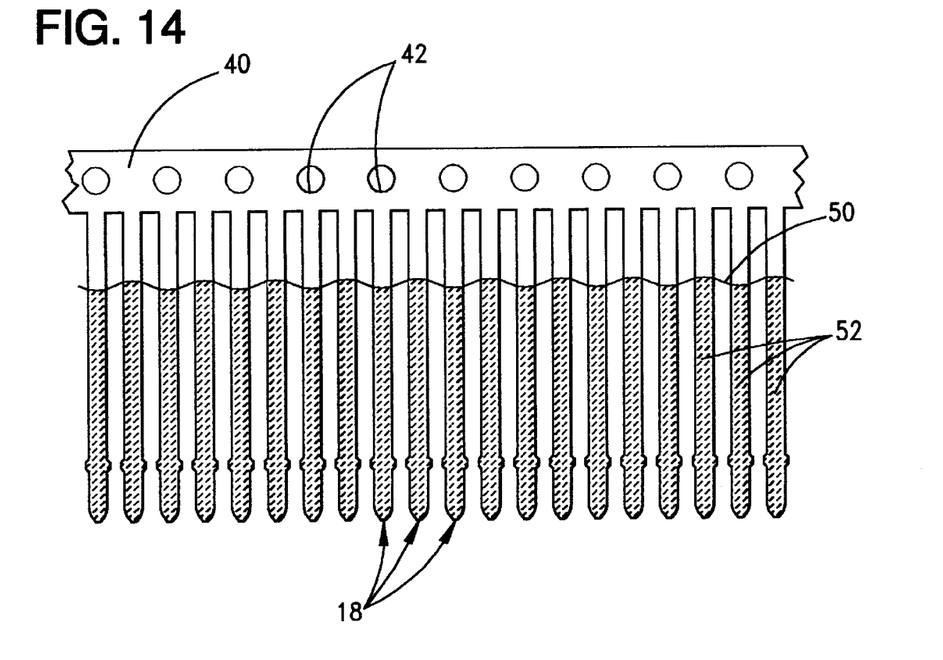
FIGS. 14–17 show various steps in a third embodiment for carrying out the method of the invention.
Figure 15:
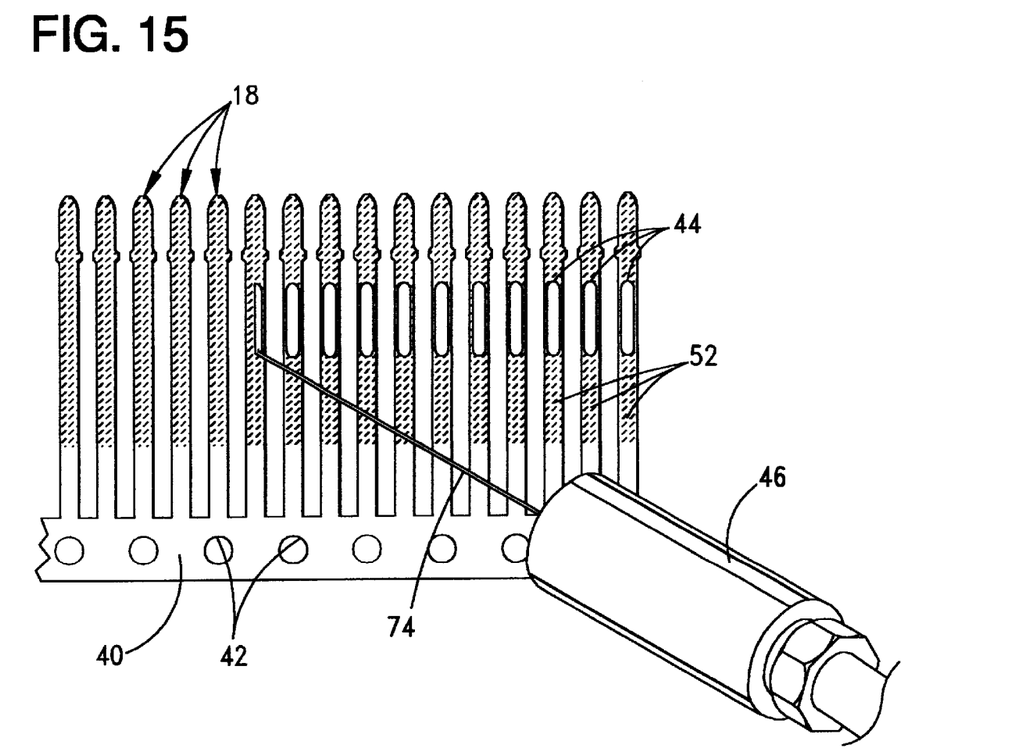
Figure 16:
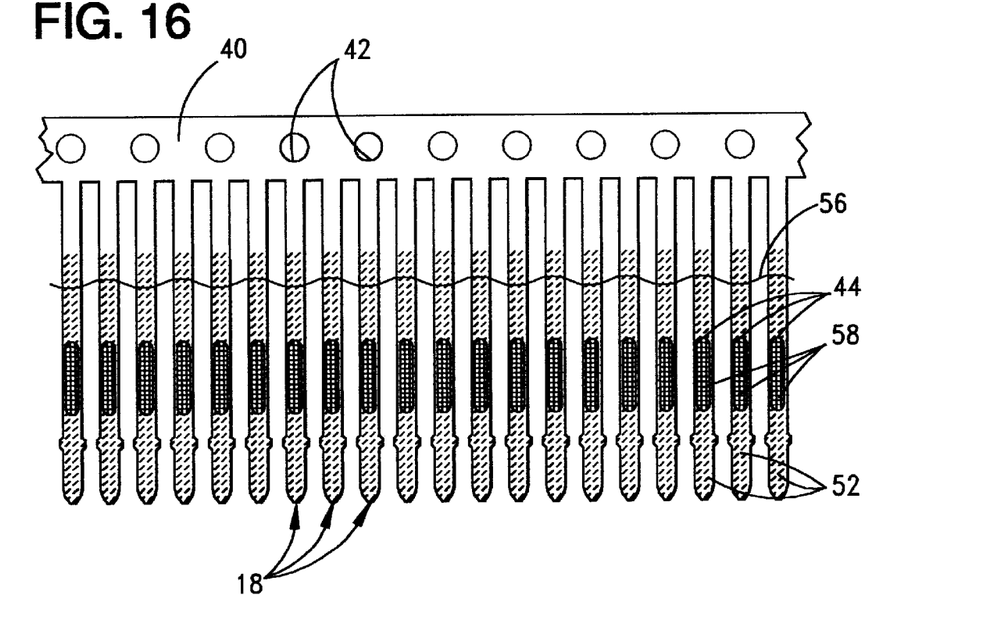
Figure 17:
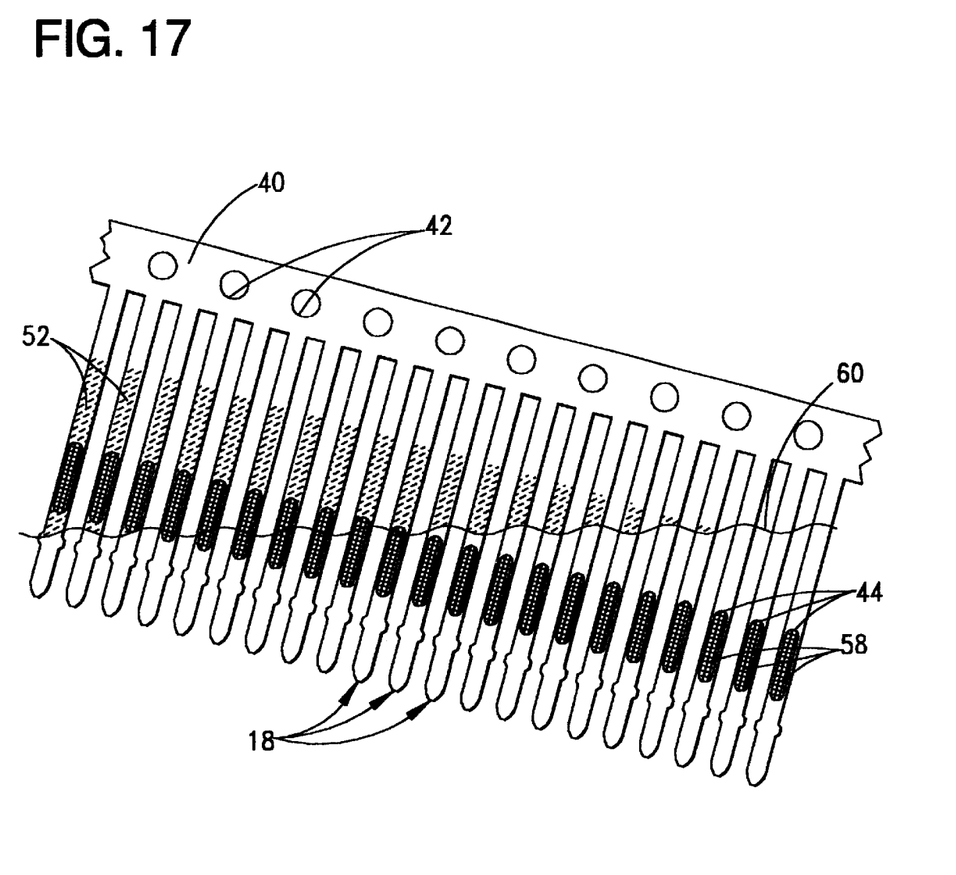

FIGS. 14–17 show the steps in a third embodiment for carrying out the method of the invention. FIG. 14 shows the terminals immersed in bath 50 of resist material 52 similar to FIG. 4 of the first embodiment, except the entirety of the terminals which are exposed in the plating process are covered with the resist material. Referring to FIG. 15, ink-jet head 46 then is used to direct a jet stream of solvent material 74 at selected areas 44 to dissolve the resist material thereat. The terminals then are moved directly to electroplating bath 56 whereat selected areas 44 are plated with the highly conductive plating material 58, such as gold, as described above in relation to FIGS. 6 and 12 of the previous embodiments. Again, as with the previous embodiments, the plated terminals are immersed in rinsing bath 60 shown in FIG. 17 whereat resist material 52 is rinsed away, leaving the terminals with selected areas 44 coated with the conductive plating material 58.

It can be seen that all of the embodiments are immersed in a bath of some form or the other of a resist material. The selected areas 44 of the terminals are prepared by an ink-jet process either before or after immersing the terminals in the bath of resist material. These methods provide a highly efficient and simple process in fabricating electrical terminal 18 or other electrical components.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A method of fabricating an electrical component, comprising the steps of:
   providing a metal electrical component;
   immersing the electrical component in a bath of resist material;
   preparing a selected area of the component by an ink-jet process for reception of a conductive plating material;
   applying the conductive plating material to said selected area; and
   removing the resist material from the electrical component.

2. The method of claim 1 wherein said conductive plating material is applied in an electroplating bath.

3. The method of claim 1 wherein said resist material is removed by a solvent.

4. The method of claim 3 wherein said resist material is removed by immersing the plated electrical component in a bath of said solvent.

5. The method of claim 1 wherein said selected area is prepared prior to immersing the component in the bath of resist material, by applying to the selected area a masking material which repels the resist material.

6. The method of claim 3 including the step of removing said masking material prior to applying the conductive plating material.

7. The method of claim 6 wherein said masking material is removed by immersing the component in a bath of mask-removing material.

8. The method of claim 1 wherein said immersing step comprises immersing the component in a bath of UV curable resist material.

9. The method of claim 8 wherein said preparing step comprises applying a masking material over the UV curable resist material in said selected area.

10. The method of claim 9 including the step of curing the unmasked resist material by using UV rays.

11. The method of claim 10, including the step of removing the masking material and uncured resist material in said selected area prior to said applying step.

12. The method of claim 1 wherein said selected area is prepared by removing the resist material in the selected area by a solvent in said inkjet process.

13. A method of fabricating an electrical component, comprising the steps of:
    providing a metal electrical component;
    applying to a selected area of the component a masking material by an ink-jet process;
    immersing the electrical component in a bath of resist material which is repelled in said selected area by the masking material;
    removing said masking material from the selected area;
    applying a plating material to said selected area; and
    removing the resist material from the electrical component.

14. The method of claim 13 wherein said masking material is removed by immersing the component in a bath of mask-removing material.

15. The method of claim 13 wherein said plating material is highly conductive and is applied in an electroplating bath.

16. The method of claim 13 herein said resist material is removed by a solvent.

17. The method of claim 16 wherein said resist material is removed by immersing the plated electrical component in a bath of said solvent.

* * * * *